March 29, 1938. A. STOLL 2,112,232
VALVE SEAT
Filed Oct. 27, 1933
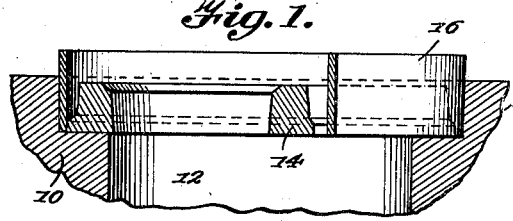
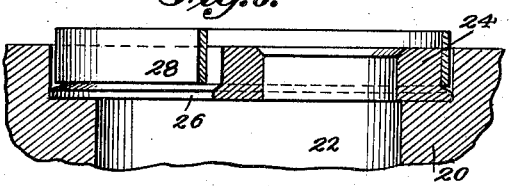
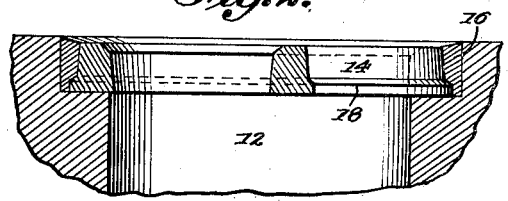
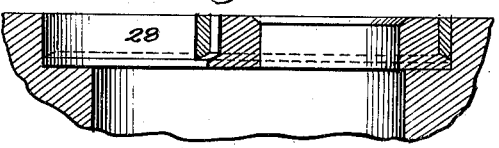
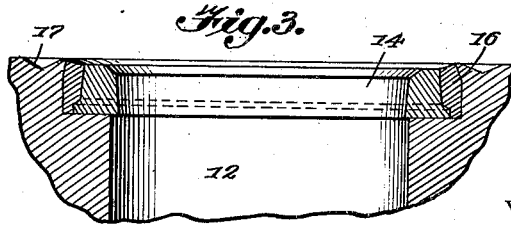
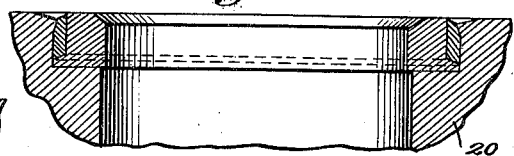
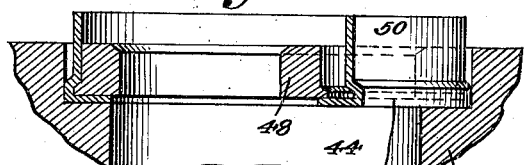
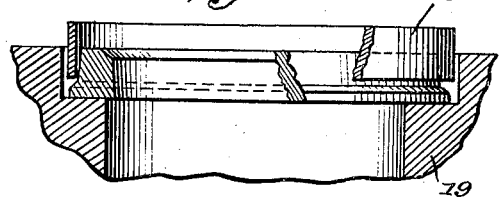
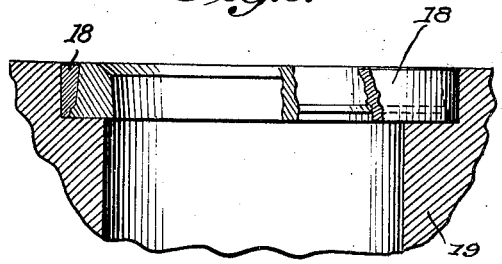
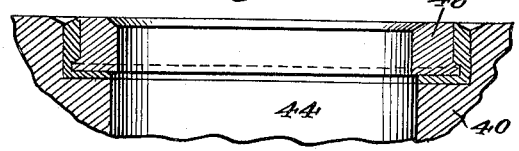
Inventor
ALBERT STOLL
BY L. G. Quesada
Attorney Patented Mar. 29, 1938

2,112,232

UNITED STATES PATENT OFFICE 2,112,232

VALVE SEAT

Albert Stoll, Detroit, Mich., assignor to National Machine Products Company, Detroit, Mich.

Application October 27, 1933, Serial No. 695,540

2 Claims. (Cl. 123—188)

This invention relates to inserted valve seats for use in internal combustion engines and the application will be found to embody matter divided out of my co-pending application filed March 3, 1933, and serially numbered 659,563.

The invention forming the subject of this application contemplates a bi-metallic inserted valve seat consisting of a hard impact ring for mounting in the counterbored recess of a poppet valve to be closely surrounded by a caulking ring of a materially softer metal which not only serves to secure the impact ring in place, but which possesses heat exchange or conducting properties of a high order so as to be effective in quickly dispersing heat away from the impact ring, it being observed in this connection that the close physical contact between the two rings throughout 360 degrees provides for the expeditious exchange of heat through the caulking ring and the distribution of the same in the surrounding support where it is dissipated by the cooling medium.

In addition, it will be found that the caulking ring has a radial wall thickness stout enough to cause the caulking ring to act with a high degree of efficiency in the transmission of heat away from the impact ring and that such stoutness will insure retention of the impact ring in the required concentric relation with respect to the valve opening during the caulking operation and thereafter.

The means by which the combined caulking and heat exchange ring is caused to have effective binding engagement with the impact ring and the means by which the caulking ring is, in turn, held in place, will be found to constitute an important feature of the invention since such means provide for the accurate centering of the impact ring and the enduring mounting of the impact ring against the contrary influence incident to use.

By way of further brief reference to the combined caulking and heat exchange ring, it is pointed out that a portion of the material forming such ring may be located beneath the impact ring to form a cushion rest therefor so that the noise incident to intermittent engagement of the valve head with the seat therefor is deadened while at the same time such portion of the caulking ring as underlies the impact ring provides a greatly increased area of contact between the ring and the surrounding material or support to further aid in dispersion of heat away from the impact ring.

In carrying out the invention, the impact ring and the surrounding caulking ring are mounted in a counterbored recess in the valve opening with the inner peripheral portion of the impact ring overhanging the valve opening for engagement by a pulling tool through the medium of which the impact ring may be removed, and since as stated above, the impact ring is held in place by a surrounding caulking ring of a softer metal, it is clear that as an incident to the removal of the impact ring, the surrounding caulking ring is sheared.

The arrangements and formations of the impact and caulking rings and the mounting of these parts will be found to be such as to avoid the need for close tolerances to the end that production is speeded up and costs incident to the employment of the inserted seat, materially reduced.

Other objects and advantages will be apparent during the course of the following description.

In the accompanying drawing forming a part of this application and in which like numerals are employed to designate like parts throughout the same, Figure 1 is a vertical sectional view illustrating the application of the impact and caulking rings to the counterbored recess of an internal combustion engine, the parts being shown in the positions occupied prior to the caulking operation, Figure 2 is a detail vertical sectional view illustrating the application of the impact and caulking rings, the parts being shown in the positions occupied subsequent to the caulking operation, Figure 3 is a detail vertical sectional view illustrating the application of the impact and caulking rings, the parts being shown in the positions occupied after the peening or securing operation, Figure 4 is a detail vertical sectional view illustrating a modification of the invention, in which the caulking ring is to be staked into place, Figure 5 is a vertical sectional view illustrating the impact and caulking rings secured in place through staking of the caulking ring, Figure 6 is a detail vertical sectional view through another form of invention, the parts being shown in the positions occupied prior to the caulking operation, Figure 7 is a detail vertical sectional view through the form of invention shown in Figure 6, the parts being shown in the positions occupied subsequent to the caulking operation, Figure 8 is a detail vertical sectional view through the form of invention shown in Figures 6 and 7, the parts being shown in the positions occupied subsequent to the peening operation, Figure 9 is a detail vertical sectional view through a further modification of the invention, the parts being shown in the positions occupied prior to the caulking operation, Figure 10 is a vertical detail sectional view through the form of invention shown in Figure 9, with the parts in the positions occupied after the caulking operation, Figure 11 is a vertical sectional view through the form of invention shown in Figure 9, with the parts in the positions occupied subsequent to the peening operation.

In the drawing, the numeral 10 designates a support in the nature of an internal combustion engine cylinder block or cylinder head, which as known, are usually cast from soft, gray iron.

The support 10 is shown in the form of a cylinder block having a valve opening 12 counterbored at the upper or outer portion thereof to provide a seat for a relatively hard impact ring 14 of a heat, acid and impact resisting alloy steel. The impact ring 14 is spaced inward from the surrounding wall of the counterbored recess to provide an intervening annular opening or recess for the reception of a caulking ring 16 of a softer material such, for example, as copper, aluminum, or soft steel having the ductility necessary to allow the caulking ring to be worked or compressed into the position shown in Figure 2, where the same appears crowded or axially compressed into the space between the impact ring and the surrounding wall of the counterbored recess to hold the impact ring in place.

More particularly, the caulking ring 16 has an axial initial dimension substantially greater than the height or axial dimension of the counterbored recess and the base portion of the caulking ring is located between the base of the impact ring and the adjacent portion of the surrounding wall of the counterbored recess.

It is clearly shown in Figures 1, 2 and 3 that the inner portion of the impact ring is formed with an external annular flange 18 flush with the base of the impact ring and having a sloping outer or upper surface defining a shoulder into engagement with which the material of the caulking ring is pressed. That is to say, the external flange at the base portion of the impact ring is overhung by a substantial portion of the caulking ring.

In Figure 3 it is shown that a portion of the cylinder block immediately surrounding the upper or outer portion of the caulking ring is peened over a portion of the caulking ring as indicated at 17 to exert a restraining force thereon and lock both rings securely in place. More particularly, the peening operation locates a portion of the material of the support in opposed relation to the external base flange 18 of the impact ring, so as to resist axial movement of the impact ring while the close crowding or compression of the caulking ring between the impact ring and the surrounding wall of the recess has the effect of holding the impact ring against lateral shifting or distortion.

It is important to observe that the material forming the caulking ring has a circumferentially uniform radial dimension sufficient to cause the caulking ring to fit snugly between the impact ring and the surrounding wall to hold the ring concentrically with the axis of the valve opening 12 during the caulking and peening operations.

In addition, it will be seen that the base flange of the impact ring has a diameter less than that of the surrounding wall of the recess. This allows the combined caulking and centering ring 16 to rest against the bottom wall of the recess and at the same time to bear against the top surface of the base flange. In this way, the bottom wall of the recess takes a part of the end pressure on the caulking ring. By reason of this, end pressure on the caulking ring due, of course, to the caulking operation, is prevented from possibly cracking the very brittle metal composing the impact ring. This is an important consideration whether the ring is mounted in a new or a used motor because in either case, the bottom wall of the recess may not be exactly true. In a word, the pressure of the caulking ring is divided so that in case the impact ring does not bear flatly against the bottom wall of the recess, the flow of the soft metal forming the caulking ring will be diverted sufficiently to avoid breaking the impact ring. In explaining this, it is pointed out that the soft metal forming the caulking ring flows in the path of the least resistance so that in case the base flange of the impact ring does not bear uniformly throughout 360 degrees against the bottom wall of the recess, there will be an uneven flow of such soft metal to avoid the creation of a pressure against the base flange sufficient to crack or break the impact ring.

Also, the stoutness of the material forming the caulking ring holds the impact ring against distortion or lateral shifting under the influence of the pressure employed in the caulking and peening operations with the result that no separate devices are necessary to maintain the impact ring concentric to the valve opening during such operations.

The material of the caulking ring possesses heat conducting or exchange properties of a high order and in fact superior to those of the impact ring to the end that the heat is effectively dispersed from the impact ring into the surrounding casting where it is dissipated by the usual cooling medium. Since the ring 16 is caulked in place under pressure, it has a uniform and intimate contact with the opposed walls of the impact ring and the surrounding wall of the counterbored recess, and such intimate and uniform contact is of substantial assistance in the exchange of heat.

The pressure employed in the caulking operation causes a portion of the material of the soft caulking ring to enter and fill out the interstices in the immediately surrounding more or less porous cast iron of the cylinder block or head producing the intimate union of the parts necessary for the rapid transmission of heat from the caulking ring to the cylinder block or head as the case may be.

It will be seen that substantially the entire outer peripheral surface of the ring 16 is in intimate pressure contact with the surrounding wall of the counterbore to bring about the rapid transmission of heat to the surrounding casting.

The easily workable or ductile nature of the material forming the caulking ring 16, allows of the use of an impact ring of a wall thickness substantially less than has heretofore been thought feasible. In explaining this, it is pointed out that the more or less brittle impact ring is placed in position without the aid of a driving force and is subsequently caulked in place by the circumferentially uniform deformation of the caulking ring as distinguished from other impact rings which are themselves pressed closely into the counterbored recess in the cylinder block and hence are subject to breakage during application.

Since the impact ring may be introduced into the counterbored recess without the aid of a driving force, such impact ring may have a reduced wall thickness as compared to other rings of which I am aware to the end that the cost of the unit is materially reduced. That is to say, the material forming the impact ring is extremely costly, especially as compared to materials suitable for use as the caulking ring and since the invention contemplates the employment of a reduced volume of such expensive metal, without a corresponding reduction in the wear resisting properties of the entire valve seat, the cost of the complete valve seat unit is reduced.

It will be observed that the caulking ring 16 is radially stout, first to allow the ring to act as an effective heat exchange element and at the same time, to increase the circumference of the caulking ring thereby establishing a greater area of contact between the caulking ring and the surrounding cylinder block for the rapid exchange of heat.

The employment of an intervening caulking ring as herein disclosed reduces the need for relatively extreme accuracy. For example, the outside diameters of other rings that are pressed in place are held to plus or minus variations of not more than .0005" and the counterbores therefor may not vary either plus or minus more than .001". The employment of the intervening caulking ring as shown herein allows the impact ring to be made with a tolerance either plus or minus of .002" and the bore of the ring receiving recess may have a similarly liberal tolerance thereby reducing the number of rejections through failure to come within extremely close tolerances.

As shown in Figures 1 and 2, the annular space between the impact ring and the substantially straight or axially extending wall of the counterbored recess is increased in width toward the outer end thereof, first, by the external taper of the impact ring and second, by the external shouldering or stepping of the impact ring.

Thus, when the relatively soft ring 16 is caulked in place as shown in Figure 2, the outer portion of the caulking ring will have a wall thickness substantially greater than that of the inner portion of the caulking ring, so that the peened metal of the cylinder block or head will be engaged with that portion of the caulking ring having the greatest wall thickness. This is important.

Also, by increasing the wall thickness of the relatively soft caulking ring 16 toward the outer end thereof, the intentional removal of the impact ring is simplified. That is to say, the application of a pulling force to the ring will merely result in shearing the caulking ring at the thickest and hence most easily handled portion without the possibility of cracking away a portion of the support 10 immediately contiguous to the counterbore.

In addition, the external taper of the impact ring defines a gradually restricted entrance opening for the soft ring 16 and thereby facilitates production.

Thus, it will be seen that the relatively soft annulus 16 serves the five following separate and distinct purposes:

(1) As a retaining or caulking ring, this feature being common and notoriously old.

(2) As a centering medium for the impact ring.

(3) As a heat transmitting and exchange medium for the dissipation of the heat accompanying internal combustion engine operation.

(4) As a means to permit the impact ring to be removed without the possibility of cracking the surrounding cast iron, it being observed in this connection that the soft material of the retaining ring allows such ring to be sheared at the thickest portion.

(5) As a means permitting of the use of a necessarily brittle impact ring having a relatively small wall thickness, this being true because the brittle impact ring may be applied without the use of a force sufficient to break it and is thereafter protected by the softer surrounding ring.

It is shown in Figures 4 and 5 that instead of peening the metal of the support, the valve seat insert may be held in place by staking the caulking ring 18. That is to say, when the caulking ring has been distorted to fill the space between the impact ring and the surrounding support 19, of whatever nature the latter happens to be, the caulking ring is staked in place by the use of a suitable staking tool. By this arrangement it is not necessary to peen the material of the cast iron support 19.

In the form of invention shown in Figures 6, 7 and 8, the cylinder block is designated by the numeral 20 and has a valve opening 22 counterbored at the upper portion thereof to provide a seat for an impact ring 24 of a heat, wear and acid resisting alloy steel. It is clearly shown in Figure 6 that the base portion of the impact ring is provided with an external annular flange 26 increasing the bearing surface of the ring and at the same time acting as a centering medium for the ring, it being noted in this latter connection, that the diameter of the flange 26 is such that the flange fits more or less closely within the counterbore of the recess.

The major portion of the impact ring 24 is spaced inward from the surrounding wall of the counterbore to define an annular groove for the reception of an endless caulking ring 28 of a ductile material such as copper, aluminum, or soft steel. When such material is caulked in place as suggested in Figure 7, it has uniform pressure contact with the adjacent impact ring to cooperate with the radial flange 26 in securing the impact ring concentrically with respect to the axis of the valve opening. In Figure 8, it is clearly illustrated that the inner portion of the caulking ring 28 is reduced in radial wall thickness and has axial pressure contact with the shoulder on the outer surface of the base flange 26.

When the caulking ring has been deformed to take the cross-section shown in Figure 7, that portion of the cylinder casting adjacent the upper or outer edge of the caulking ring is peened into overhanging engagement with a portion of the caulking ring so as to hold such ring and the impact ring firmly in place, or if desired, the caulking ring may be staked so that both the caulking ring and the impact ring are secured in position.

Referring now to Figures 9, 10 and 11 it will be seen that the cylinder block 40 of gray cast iron or the like, is provided with a valve opening 44 having the outer portion thereof counterbored for the reception of an impact ring 46 of a hard metal such as alloy steel having the impact, wear, and acid resisting properties known to be desirable for use as the valve seat in an internal combustion engine.

It is shown that the impact ring 48 is surrounded by an annulus 50 having an outwardly offset lower portion 52 defining an internal groove for the reception of the radial base flange of the impact ring. The annulus 50 which is of an easily workable material such as copper, aluminum, or soft steel is formed with an inwardly projecting annular base flange or rim 54 resting upon the shoulder of the counterbore and forming a cushion rest for the impact ring.

The annulus 50 has a wall thickness initially less than the space between the major portion of the impact ring and the surrounding wall of the counterbore to allow the material of the annulus 50 to be caulked into this space for the purpose of holding the ring securely in place.

It will be seen that the annulus 50, together with its base flange 54, completely spaces the impact ring from the material forming the cylinder block to deaden the noise incident to the pounding of the valve against its seat. It is well known that a laminated structure is especially effective in deadening noises due to valve operation in internal combustion engines. Also, since the member 50 and its base flange 54 is of a soft material, the value of such part as a noise deadening agent is increased.

By causing a portion of the annulus 50 to underlie the impact ring as shown in Figures 9, 10 and 11, a greatly increased area of contact is provided between the caulking ring and the impact ring and the cylinder block for effective transmission of heat.

The radial projection of the base portion of the impact ring 48 into the groove defined by the rib 52 provides an interlocking connection between the rings 48 and 50 with the result that such rings may be handled as a unit both in trade and while being applied.

It will be seen that in all forms of the invention herein disclosed the internal diameter of the impact ring is slightly less than the bore immediately below to define an internal annular overhanging lip for engagement by a pulling or lifting tool, the details of which tool have no place herein. It is believed to be clear that the application of a pulling or lifting tool to the impact ring to exert a lifting or pulling force thereon will result in the axial movement of the impact ring and in the shearing of the softer surrounding ring.

The application of a new impact ring is a very simple matter and the seating of a new securing and heat conducting ring is equally simple.

Having thus described the invention what is claimed is:

1. In an internal combustion engine, a support having an opening provided with a counterbore having a straight axial side wall, an impact ring in the counterbore and having an external base flange, said impact ring and the base flange thereof being spaced radially inwardly of the surrounding straight side wall of the counterbore to define an annular space, the impact ring being externally tapered to gradually enlarge said annular space to the direction of the outer end of the counterbore, and a deformable combined centering, caulking, and heat exchange ring of a relatively soft material positioned in the annular space in engagement with the bottom wall of the counterbore, and having an initial wall thickness to fit closely between the base flange of the impact ring and the surrounding side wall of the counterbore to center the impact ring in the counterbore, said second-named ring having an initial axial dimension greater than the impact ring, the axial dimension of said second-named ring being reduced by deformation thereof to completely fill the space between the impact ring and the wall of the counterbore.

2. In a structure of the class described, a support having an opening provided with a counterbore formed with bottom and side walls, a hard impact ring in the counterbore and having an external base flange of a diameter definitely less than the diameter of the counterbore leaving an annular space between the impact ring and the side wall of the counterbore increased in area toward the outer end of the counterbore, and a deformable combined centering and caulking ring of a relatively soft material positioned in the annular space in engagement with the bottom wall of the counterbore and having an initial wall thickness to fit closely between the base flange of the impact ring and the side wall of the counterbore to center the impact ring in the counterbore, said second-named ring having an initial axial dimension greater than the impact ring, the axial dimension of said second-named ring being reduced by deformation thereof to completely fill the space between the impact ring and the wall of the counterbore.

ALBERT STOLL.